United States Patent [19]

Nohira et al.

[11] 4,191,135
[45] Mar. 4, 1980

[54] COMBUSTION CHAMBER OF AN INTERNAL COMBUSTION ENGINE

[75] Inventors: Hidetaka Nohira, Mishima; Sumio Ito, Susono; Hisashi Ohki, Numazu, all of Japan

[73] Assignee: Toyota Jidosha Kogyo Kabushiki Kaisha, Toyota, Japan

[21] Appl. No.: 857,887

[22] Filed: Dec. 6, 1977

[30] Foreign Application Priority Data

Sep. 27, 1977 [JP] Japan .............................. 52-115104

[51] Int. Cl.$^2$ ............................................ F02B 23/00
[52] U.S. Cl. ................................. 123/30 C; 123/30 D
[58] Field of Search ................ 123/30 C, 75 B, 30 D, 123/191 S, 191 SP, 32 SP, 119 D, 124 R, 26, 32 E

[56] References Cited

U.S. PATENT DOCUMENTS

| | | | |
|---|---|---|---|
| 3,304,922 | 2/1967 | Hideg ............................ | 123/30 D |
| 3,318,292 | 5/1967 | Hideg ............................ | 123/30 C |
| 3,418,981 | 12/1968 | Von Seggern et al. ............ | 123/75 B |
| 3,550,566 | 12/1970 | Hoffman ........................ | 123/30 C |
| 3,991,729 | 11/1976 | Notaro .......................... | 123/119 D |
| 3,999,532 | 12/1976 | Kornhauser ..................... | 123/191 S |
| 4,004,563 | 1/1977 | Nakamura et al. ............... | 123/191 S |
| 4,006,720 | 2/1977 | Sato et al. ..................... | 123/191 SP |
| 4,041,923 | 8/1977 | Konishi et al. .................. | 123/30 C |
| 4,090,479 | 5/1978 | Kaye ............................ | 123/30 C |

FOREIGN PATENT DOCUMENTS 573896 4/1959 Canada .................................... 123/30.2

*Primary Examiner*—Charles J. Myhre
*Assistant Examiner*—R. A. Nelli
*Attorney, Agent, or Firm*—Kenyon & Kenyon

[57] ABSTRACT

Disclosed is an internal combustion engine comprising a combustion chamber and an accumulation chamber which are interconnected to each other via a valve. The opening operation of the valve is controlled so that the valve remains opened during the compression stroke. In the first half of the compression stroke, a jet of the combustible mixture is spouted out into the combustion chamber from the accumulation chamber to create a strong swirl motion in the combustion chamber. In the latter half of the compression stroke, the combustible mixture in the combustion chamber flows into the accumulation chamber to accumulate the combustible mixture under high pressure, which is spouted out into the combustion chamber at the next cycle, in the accumulation chamber.

31 Claims, 18 Drawing Figures

COMBUSTION CHAMBER OF AN INTERNAL COMBUSTION ENGINE

DESCRIPTION OF THE INVENTION

The present invention relates to an internal combustion engine.

At present, in the field of internal combustion engines, it is an important problem to improve the thermal efficiency while reducing the amount of harmful components in exhaust gas. As a method of effectively reducing the amount of harmful components in exhaust gas, there has been known a method of simultaneously reducing the amount of harmful HC, CO and $NO_x$ components in the exhaust gas by using a lean air-fuel mixture, and; there has also been known a method of reducing the amount of harmful $NO_x$ components in the exhaust gas by recirculating the exhaust gas into the intake system of an engine. However, in either case wherein a lean air-fuel mixture or a mixture containing the recirculated exhaust gas therein is used, there occurs a common problem in that, since the flame speed of such a mixture is very low and, thus, the burning velocity is low, a high thermal efficiency cannot be obtained and, as a result, a satisfactory high output of an engine cannot be obtained. Consequently, in the case wherein a lean air-fuel mixture or a mixture containing the recirculated exhaust gas therein is used, in order to improve a thermal efficiency, the most important problem is to increase the flame speed. As a method of increasing the flame speed in the combustion chamber of an engine, the following three methods (I), (II) and (III) have been proposed.

(I) A method of creating a swirl motion of a combustible mixture in the combustion chamber by the combustible mixture introduced into the combustion chamber from the intake port of an engine.

(II) A method of creating a turbulence in the combustion chamber by the squish action between the cylinder head and the piston.

(III) A method of creating a swirl motion of the combustible mixture in the combustion chamber by the air which is sucked from the atmosphere via an auxiliary intake valve, due to the pressure difference between the atmospheric pressure and vacuum in the combustion chamber, and is spouted out into the combustion chamber at the time of the intake stroke.

However, in the method mentioned in item (I), above, the swirl motion created at the time of the intake stroke becomes weak at the end of the compression stroke. In addition, in the method mentioned in item (I), above, while the turbulence is created when the piston reaches an approximate top dead center, the turbulence instantaneously becomes weak because such a turbulence does not have such a large kinetic energy as the swirl motion has. Furthermore, in the method mentioned in item (III), above, when the vacuum level in the combustion chamber at the time of the intake stroke is small, as in the case wherein the engine is operating under full load, since the speed of the air spouted out into the combustion chamber is very low, it is difficult to create a swirl motion in the combustion chamber. In addition, in this method, since a swirl motion is created at the time of the intake stroke, the swirl motion thus created becomes weak at the end of the compression stroke. Consequently, it is difficult to create a strong swirl motion in the combustion chamber, which continues to be maintained during the combustion process, by using the above mentioned methods.

An object of the present invention is to provide an internal combustion engine capable of greatly increasing the flame speed by creating a strong swirl motion in the combustion chamber independent of the load level of the engine, which motion continues to be maintained during the combustion process.

According to the present invention, there is provided an internal combustion engine comprising: a cylinder block having a cylinder bore therein; a cylinder head mounted on said cylinder block and having a cavity therein; a piston reciprocally movable in said cylinder bore; a combustion chamber formed between said cylinder head and said piston, said cavity having a port connected to said combustion chamber; an intake valve movably mounted on said cylinder head for leading a suction gas into said combustion chamber; an exhaust valve movably mounted on said cylinder head for discharging an exhaust gas into the atmosphere; valve means for opening said port of the cavity during the compression stroke to spout out a jet of the suction gas under pressure into said combustion chamber from said cavity during the first half of the compression stroke and permit the inflow of the suction gas into said cavity from said combustion chamber during the latter half of the compression stroke for temporarily accumulating the suction gas under pressure after said port is closed, and guide means for guiding said jet of the suction gas to create a strong swirl motion in said combustion chamber.

The present invention may be more fully understood from the following description of preferred embodiments of the invention, together with the accompanying drawings.

DESCRIPTION OF PREFERRED EMBODIMENTS

Figure 1:
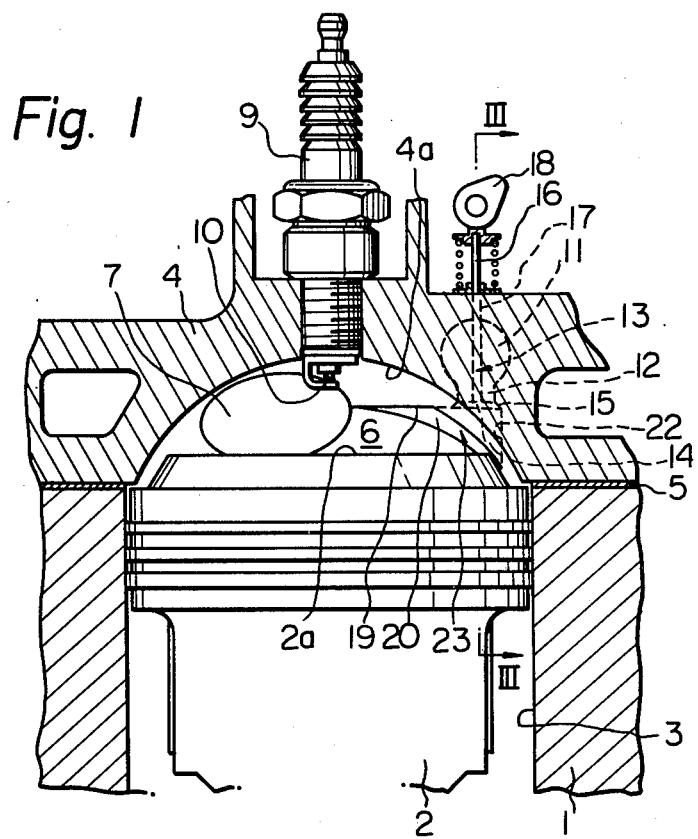
FIG. 1 is a cross-sectional side view of an embodiment of an internal combustion engine according to the present invention.
Figure 2:
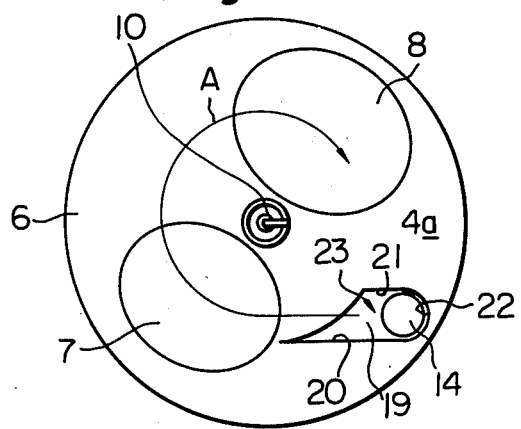
FIG. 2 is a bottom view of the cylinder head shown in FIG. 1.
Figure 3:
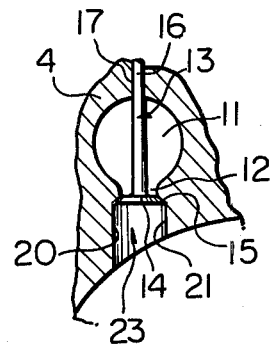
FIG. 3 is a cross-sectional view taken along the line III—III in FIG. 1.

Referring to FIGS. 1 and 2, 1 designates a cylinder block, 2 a piston reciprocally movable in a cylinder bore 3 formed in the cylinder block 1; 4 designates a cylinder head fixed onto the cylinder block 1 via a gasket 5; 6 designates a combustion chamber formed between the top surface 2a of the piston 2 and the inner wall 4a of the cylinder head 4; 7 designates an exhaust valve, 8 an intake valve, 9 a spark plug and 10 an electrode of the spark plug 9. In the embodiment shown in FIG. 1, the electrode 10 of the spark plug 9 is arranged near the apex of the semi-spherical combustion chamber 6. As is shown in FIGS. 1 and 3, according to the present invention, an accumulation chamber 11 is formed in the cylinder head 4. A valve port 12 is formed at the lower end of the accumulation chamber 11, and a valve 13 is movably arranged in the cylinder head 4 so as to open and close the valve port 12. A valve head 14 of the valve 13 is arranged to abut against a valve seat 15 formed on the cylinder head 4 so that the valve port 12 is closed when the valve head 14 abuts against the valve seat 15. On the other hand, a valve stem 16 of the valve 13 is arranged in a hole 17 formed in the cylinder head 4 so as to be slidably movable in the hole 17 and, in addition, the top of the valve stem 16 projects from the upper surface of the cylinder head 4. The tip of the valve stem 16 cooperates with a cam 18 connected to the crank shaft of the engine, so that the valve 13 is actuated by the cam 18 to keep the valve port 12 open during the time in which the piston 2 is positioned within a predetermined range of crank angle as described in detail hereinafter.

A groove 23, defined by a horizontal wall 19, a pair of vertical walls 20, 21 and a semi-cylindrical wall 22, is formed on the inner wall 4a of the cylinder head 4. As is shown in FIGS. 1 through 3, the valve head 14 of the valve 13 is arranged to be exposed to the inside of the groove 23. In addition, as is shown in FIG. 2, the semi-cylindrical wall 22 is arranged at a position closely adjacent to the peripheral edge of the valve head 14 so that, when the valve 13 remains open, the gas in the combustion chamber 6 flows into the accumulation chamber 11 via an opening formed between the valve head 14 and the valve seat 15, at a position located in the right side in FIG. 2; or the gas in the accumulation chamber 11 flows into the combustion chamber 6 via the above-mentioned opening. In addition, as is shown in FIG. 2, the groove 23 is formed so as to extend in the circumferential direction of the combustion chamber 6 so that the gas flowing into the combustion chamber 6 from the accumulation chamber 11 causes a swirl motion shown by the arrow A in the combustion chamber 6.

Figure 4:
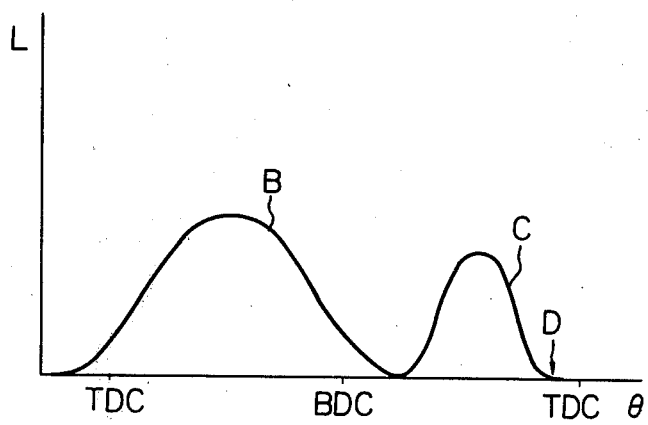
FIG. 4 is a graph showing an opening time of the valve of the accumulation chamber.

FIG. 4 shows the opening timing of the intake valve 8 and the valve 13. In FIG. 4, the ordinate L indicates valve lift and the abscissa θ indicates crank angle. In addition, in FIG. 4, the curved lines B and C indicate the opening timing of the intake valve 8 and the valve 13, respectively, and the arrow D indicates the ignition timing. From FIG. 4, it will be understood that the valve 13 remains open at the time of the compression stroke within crank angle ranged from a crank angle near that at which the intake valve 8 is closed to a crank angle near that at which ignition is carried out by the spark plug 9.

In operation, at the time of the intake stroke, a lean air-fuel mixture or a mixture containing a large amount of the recirculated exhaust gas therein is introduced into the combustion chamber 6 via the intake valve 8. After this, when the intake valve 8 is closed and the piston 2 starts the compressing action of the combustible mixture in the combustion chamber 6, the valve 13 is opened. As is hereinafter described, a combustible mixture under high pressure, which is introduced into the accumulation chamber 11 at the compression stroke in the preceding cycle, is accumulated in the accumulation chamber 11 and, on the other hand, the pressure in the combustion chamber 6 is lower than the atmospheric pressure at the start of the compression stroke. Consequently, the pressure difference between the pressure in the combustion chamber 6 and the accumulation chamber 11 is large and, thus, when the valve 13 is opened, the combustible mixture accumulated in the accumulation chamber 11 is spouted out into the combustion chamber 6 at a high speed. As a result of this, a strong swirl motion shown by the arrow A in FIG. 2 is created in the combustion chamber 6. Then, if the piston 2 further moves upwards, since the pressure in the accumulation chamber 11 is maintained higher than that in the combustion chamber 6 for a while, the combustible mixture in the accumulation chamber 11 continues to be spouted out into the combustion chamber 6. As a result of this, the swirl motion created in the combustion chamber 6 is further strengthened. When the piston 2 further moves upwards and the pressure in the accumulation chamber 11 becomes equal to that in the combustion chamber 6, the spouting operation of the combustible mixture in the accumulation chamber 11 is stopped. After this, when the piston 2 further moves upwards, since the pressure in the combustion chamber 6 becomes higher than that in the accumulation chamber 11, the combustible mixture in the combustion chamber 6 flows into the accumulation chamber 11. As mentioned previously, the valve 13 remains opened until the piston 2 reaches a position corresponding to a crank angle near the crank angle at which the ignition is carried out. In addition, the pressure in the combustion chamber 6 is maintained approximately equal to that in the accumulation chamber 11 during the time in which the combustible mixture in the combustion chamber 6 flows into the accumulation chamber 11, and the pressure in the combustion chamber 6 becomes a high level when the piston 2 reaches a position corresponding to the crank angle at which ignition is carried out. Consequently, when the valve 13 is closed, the combustible mixture under high pressure is accumulated in the accumulation chamber 11. Thus, this combustible mixture under high pressure is spouted out into the combustion chamber 6 at the next cycle to create a strong swirl motion in the combustion chamber 6.

The combustible mixture in the combustion chamber 6 is ignited by the spark plug 9 immediately after or before the valve 13 is closed. At this time, a strong swirl motion is created in the combustion chamber 6. Consequently, the flame of the combustible mixture thus ignited rapidly or propagates over the entire space in the combustion chamber 6 and, as a result, the flame speed is extremely increased.

In the case wherein the engine is operating under a light load, the absolute pressure in the combustion chamber 6 immediately after the intake valve 8 is closed is lower as compared with the case wherein the engine is operating under a heavy load. Consequently, in the case wherein the engine is operating under a light load, the absolute pressure in the combustion chamber 6 immediately before the valve 13 is closed is lower as compared with the case wherein the engine is operating under a heavy load. Therefore, while, in the case wherein the engine is operating under a light load, the absolute pressure of the combustible mixture accumulated in the accumulation chamber 11 is lower as compared with the case wherein the engine is operating under a heavy load, a pressure ratio of the absolute pressure of the combustible mixture accumulated in the accumulation chamber 11 to the absolute pressure in the combustion chamber 6 immediately after the intake valve 8 is closed is maintained to a constant value above two-fold at any load level of the engine. Consequently, taking into consideration the fact that the velocity of the combustible mixture spouted out into the combustion chamber 6 from the accumulation chamber 11 is determined by the pressure difference between the absolute pressure in the combustion chamber 6 and the absolute pressure in the accumulation chamber 11, it will be understood that a strong and near-sonic stream of the combustible mixture spouted out into the combustion chamber 6 from the accumulation chamber 11 can be always obtained independent of the load level of the engine.

On the other hand, the turbulence caused in the combustion chamber 6 by the reciprocal movement of the piston 2 becomes strong as the engine speed is increased. Consequently, if an excessively strong turbulence is caused in the combustion chamber 6 by the combustible mixture spouted out from the accumulation chamber 11 when the engine is operating at a high speed, there occurs a problem in that the flame core created by the spark plug 9 is extinguished and, thus, a stable ignition cannot be obtained. However, in the present invention, since the flow resistance in the opening formed between the valve head 14 and the valve seat 15 becomes large and, at the same time, the length of time during which the valve 13 remains opened is shortened as the engine speed is increased, the amount of the combustible mixture flowing into the accumulation chamber 11 is accordingly reduced. Thus, the amount of the combustible mixture spouted out into the combustion chamber 6 from the accumulation chamber 11 is reduced as the engine speed is increased. As a result of this, since a swirl motion created in the combustion chamber 6 becomes weak as the engine speed is increased, it is possible to avoid a danger that a stable ignition cannot be obtained. In addition, in the present invention, there is an advantage in that a strong swirl motion can be created when the speed of combustion is low, as in the case wherein the engine is operating under a light load at a low speed, for example, at the time of idling.

Figure 5:
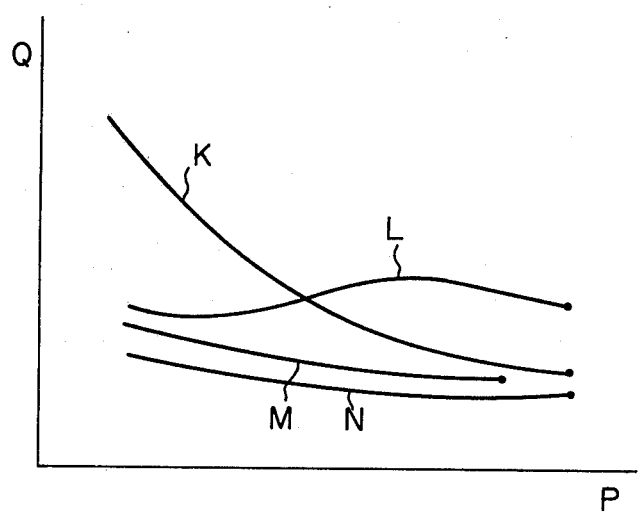
FIG. 5 is a graph showing the relationship between the opening timing of the valve of the accumulation chamber and specific fuel consumption.

FIG. 5 shows the influence on specific fuel consumption when the opening and closing timing of the valve 13 is changed. In FIG. 5, the ordinate Q indicates the specific fuel consumption, and the abscissa P indicates the load level of the engine. In addition, in FIG. 5, the curved line K indicates the specific fuel consumption in a conventional engine having no accumulation chamber, and the curved line L, M and N indicate the specific fuel consumption when the engine is operating under the states wherein the opening and closing timing of the valve 13 is set as shown in the following TABLE.

TABLE

| | Opening timing | Closing timing |
|---|---|---|
| L | 30 degrees after BDC | 5 degrees after TDC |
| M | 30 degrees before BDC | 60 degrees before TDC |
| N | 50 degrees after BDC | 20 degrees before TDC |

When the valve 13 is closed at 5 degrees after TDC, as shown by L in the TABLE, since the ignition timing is normally set at a timing which is earlier than the closing timing of the valve 13, the flame of the combustible mixture enters into the accumulation chamber 11. As a result of this, the combustible mixture located in the accumulation chamber 11 is burned. However, since the combustion in the accumulation chamber 11 does not contribute to the work for moving the piston 2 downwardly, the specific fuel consumption is increased as shown by L in FIG. 5. On the other hand, when the valve 13 is opened at 30 degrees before BDC at the timing of the intake stroke, as shown by M in the TABLE, since the combustible mixture is spouted out into the combustion chamber 6 from the accumulation chamber 11 at the time of the intake stroke, the amount of the combustible mixture introduced into the combustion chamber 6 via the intake valve 8 is reduced. This results in causing a reduction in charging efficiency and, as a result, a reduction in output power of the engine when the engine is operating under a heavy load. Consequently, it is preferable that the opening timing of the valve 13 be set at a timing near the tming at which the intake valve 8 is closed, as shown by N in the TABLE, and that the closing timing of the valve 13 be set at a timing near the ignition timing which is most advanced. By setting the opening and closing timing of the valve 13 as shown by N in the TABLE, the specific fuel consumption is greatly improved as shown in FIG. 5. In addition, if the flame of the combustible mixture does not enter into the accumulation chamber 11, the closing timing of the valve 13 may be retarded by about 10 through 15 degrees with respect to the ignition timing which is most advanced.

Figure 6:
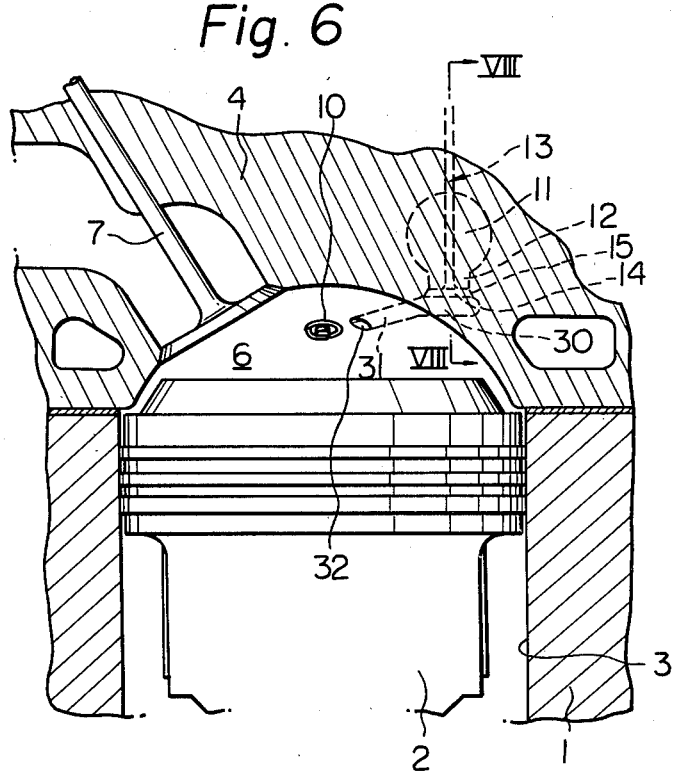
FIG. 6 is a cross-sectional side view of another embodiment according to the present invention.
Figure 7:
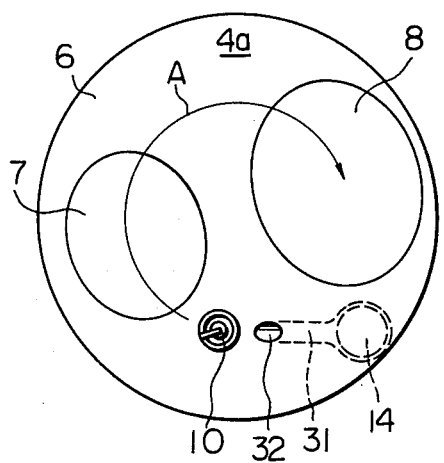
FIG. 7 is a bottom view of the cylinder head shown in FIG. 6.
Figure 8:
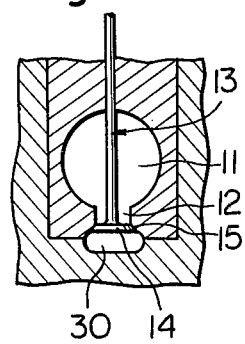
FIG. 8 is a cross-sectional view taken along the line VIII—VIII in FIG. 6.

FIG. 6 shows another embodiment according to the present invention. In FIG. 6, similar components are indicated with the same reference numerals as used in FIG. 1. In addition, in FIG. 6, the depiction of the intake valve is omitted. Referring to FIGS. 7 through 8, a valve chamber 30 is formed in the cylinder head 4 so that the valve head 14 of the valve 13 moves downwards into the valve chamber 30. This valve chamber 30 is connected to the combustion chamber 6 via a connecting passage 31 formed in the cylinder head 4. The connecting passage 31 is so arranged that the opening 32 thereof is directed to the circumferential direction of the combustion chamber 6 as shown in FIG. 7. The electrode 10 of the spark plug is arranged at a position near the opening 32 so that a part of the combustible mixture spouted out into the combustion chamber 6 via the connecting passage 31 directly impinges upon the electrode 10. The opening and closing timing of the valve 13 shown in FIG. 6 is set at the same timing as that of the valve 13 shown in FIG. 1. Consequently, in the first half of the time during which the valve 13 remains open, the combustible mixture is spouted out into the combustion chamber 6 from the accumulation chamber 11 via the connecting passage 31. On the other hand, in the latter half of said time during which the valve 13 remains open, the combustible mixture in the combustion chamber 6 flows into the accumulation chamber 11, as mentioned previously.

As mentioned above, in this embodiment, a part of the combustible mixture spouted out into the combustion chamber 6 from the accumulation chamber 11 at the time of the compression stroke directly impinges upon the electrode 10. Consequently, the residual exhaust gas created by the combustion in the preceding cycle and remaining around the electrode 10 is scavenged by the combustible mixture spouted out from the accumulation chamber 11 and, thus, the ignitability by the spark plug can be improved. In addition, in this embodiment, the flame of the combustible mixture in the combustion chamber 6 enters into the valve chamber 30 via the connecting passage 31 and ignites the combustible mixture in the valve chamber 30. After this, when the pressure in the valve chamber 30 is increased, the flame is spouted out into the combustion chamber 6 from the valve chamber 30 via the connecting passage 31. As a result of this, since a swirl motion created in the combustion chamber 6 is strengthened by the flame spouted out from the valve chamber 30, the flame speed is further increased.

Figure 9:
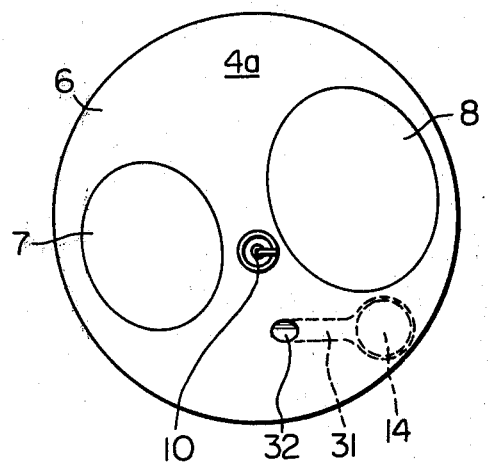
FIG. 9 is a bottom view of the cylinder head of a further embodiment according to the present invention.
Figure 10:
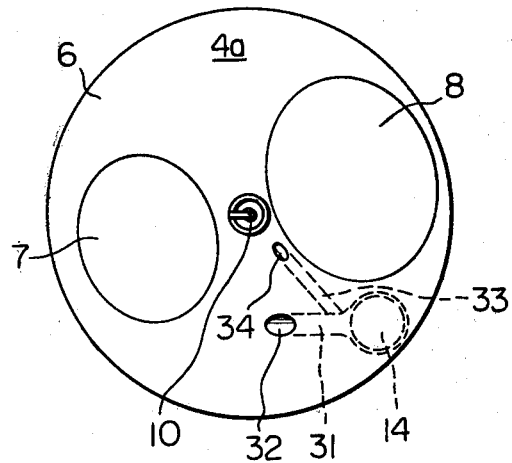
FIG. 10 is a bottom view of the cylinder head of a still further embodiment according to the present invention.

In general, in an engine having a semi-spherical combustion chamber as shown in FIG. 9, it is preferable that the electrode 10 of the spark plug be arranged near the center of the combustion chamber 6, that is, near the apex of the combustion chamber 6, as shown in FIG. 9. This is because the flame core uniformly grows towards the periphery of the combustion chamber 6 and, as a result, the burning velocity is increased. However, in the arrangement of the electrode 10 shown in FIG. 9, a satisfactory scavenging operation of the electrode 10 can not be obtained. Consequently, in order to effectively scavenge the electrode 10 of the spark plug, as is shown in FIG. 10, an auxiliary connecting passage 33 connected to the connecting passage 31 and having an opening 34 directed to the electrode 10 may be formed in the cylinder head 4, so that a part of the combustible mixture spouted out from the accumulation chamber 11 is led into the auxiliary connecting passage 31 to scavenge the electrode 10 by said part of the combustible mixture.

Figure 11:
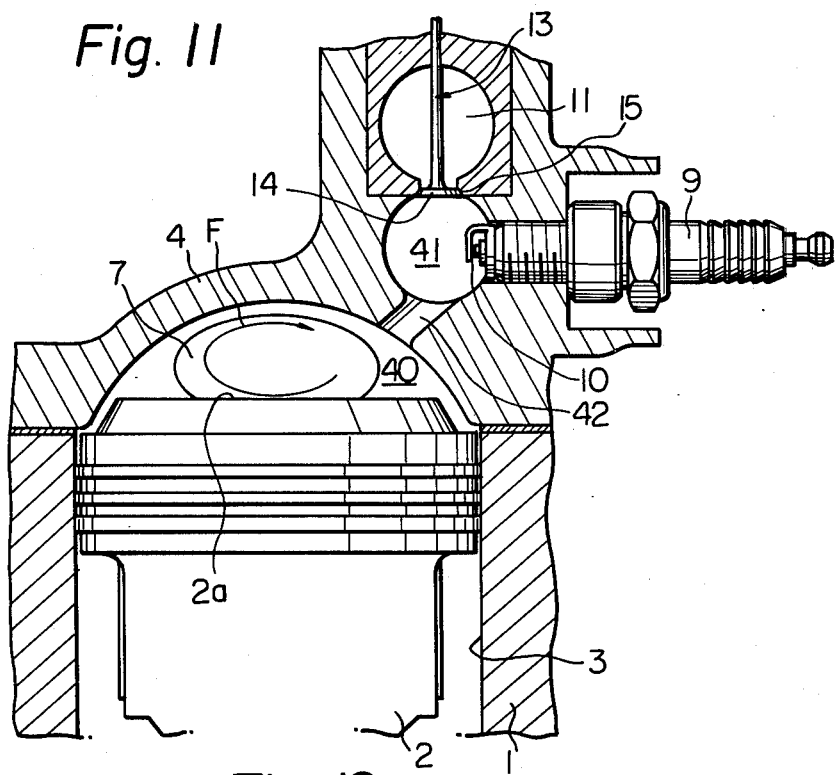
FIG. 11 is a cross-sectional side view of a still further embodiment according to the present invention.
Figure 12:
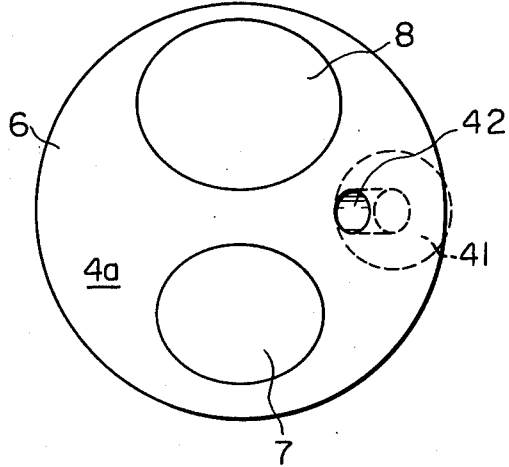
FIG. 12 is a bottom view of the cylinder head shown in FIG. 11.

FIGS. 11 and 12 show the case wherein the present invention is applied to an engine equipped with an auxiliary combustion chamber. In FIGS. 11 and 12, similar components are indicated with the same reference numerals as used in FIG. 1. Referring to FIGS. 11 and 12, a combustion chamber comprises a main combustion chamber 40 and an auxiliary combustion chamber 41 which are interconnected to each other via a connecting passage 42. The electrode 10 of the spark plug 9 is disposed in the auxiliary combustion chamber 41, and the connecting passage 42 is formed in the cylinder head 4 so that the opening of the connecting passage 42 is directed to the top surface 2a of the piston 2. The accumulation chamber 11 is arranged above the auxiliary combustion chamber 41 and connected to the auxiliary combustion chamber 41 via the valve 13. The opening and closing timing of this valve 13 is the same as that of the valve 13 shown in FIG. 1.

In the embodiment shown in FIG. 11, when the intake valve 8 is closed, the valve 13 is opened. At this time, the combustible mixture under high pressure, which is accumulated in the accumulation chamber 11, is spouted out into the main combustion chamber 40 via the auxiliary combustion chamber 41 and the connecting passage 42 and, as a result, a strong swirl motion rotating about a horizontal axis is created in the main combustion chamber 40, as shown by the arrow F in FIG. 11. At this time, the inside of the auxiliary combustion chamber 41 is scavenged by the combustible mixture spouted out from the accumulation chamber 11. After this, when the piston 2 moves upwards, the pressure in the main combustion chamber 40 becomes larger than that in the accumulation chamber 11 and, as a result, the combustible mixture in the main combustion chamber 40 flows into the accumulation chamber 11 via the connecting passage 42 and the auxiliary combustion chamber 41. When the valve 13 is closed, the combustible mixture under high pressure is accumulated in the accumulation chamber 11, and the auxiliary combustion chamber 41 is filled with the combustible mixture containing an extremely small amount of the residual exhaust gas therein. After this, the combustible mixture in the auxiliary combustion chamber 41 is ignited by the spark plug 9 and, then, the flame of the combustible mixture thus ignited is spouted out into the main combustion chamber 40 via the connecting passage 42. As mentioned above, a strong swirl motion F has been created before the flame is spouted out into the main combustion chamber 40. Consequently, when the jet flame is spouted out into the main combustion chamber 40, the strong swirl motion F is further strengthened by the flame. As a result of this, since a strong turbulence is caused in the main combustion chamber 40, the burning velocity is remarkably increased.

Figure 13:
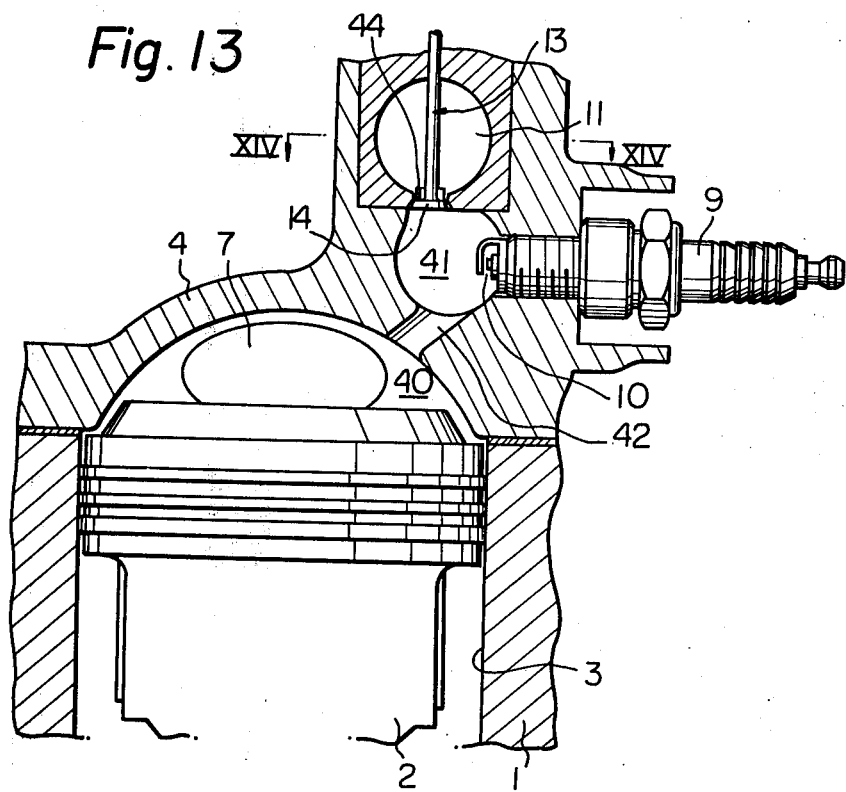
FIG. 13 is a cross-sectional side view of a still further embodiment according to the present invention.
Figure 14:
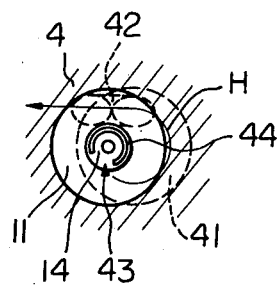
FIG. 14 is a cross-sectional view taken along the line XIV—XIV in FIG. 13.

FIGS. 13 and 14 show another embodiment of an engine shown in FIG. 11. In this embodiment, the accumulation chamber 11 is eccentrically arranged with respect to the vertical center axis of the auxiliary combustion chamber 41, and a shroud 44 is formed in one piece on the rear surface of the valve head 14 of the valve 13. This shroud 44 has a cut out 43 which is positioned at the lower side in FIG. 14. In addition, the connecting passage 42 is arranged to be tangentially connected to the circumferential inner wall of the auxiliary combustion chamber 41.

In operation, when the valve 13 is opened, the combustible mixture is spouted out into the auxiliary combustion chamber 41 from the accumulation chamber 11 via the cut out 43 and then moves forwards along the peripheral inner wall of the auxiliary combustion chamber 41, as shown by the arrow H in FIG. 14. After this, the combustible is spouted out into the main combustion chamber 40 via the connecting passage 42. When the combustible mixture spouted out from the accumulation chamber 11 flows in the auxiliary combustion chamber 41, the space around the electrode 10 of the spark plug 9 is scavenged by the combustible mixture, thus obtaining good ignitability. When the pressure in the main combustion chamber 40 becomes larger than that in the accumulation chamber 11 and, thus, the combustible mixture flows into the auxiliary combustion chamber 41 from the main combustion chamber 40, this combustible mixture causes a swirl motion in the auxiliary combustion chamber 41, which rotates in the direction opposite to the flow direction shown by the arrow H in FIG. 14. Therefore, when the combustible mixture in the auxiliary combustion chamber 41 is ignited by the spark plug 9, the flame of the combustible mixture rapidly propagates over the entire space in the auxiliary combustion chamber 41 due to the swirl motion. As a result of this, a strong jet flame is spouted out into the main combustion chamber 40 from the connecting passage 42.

Figure 15:
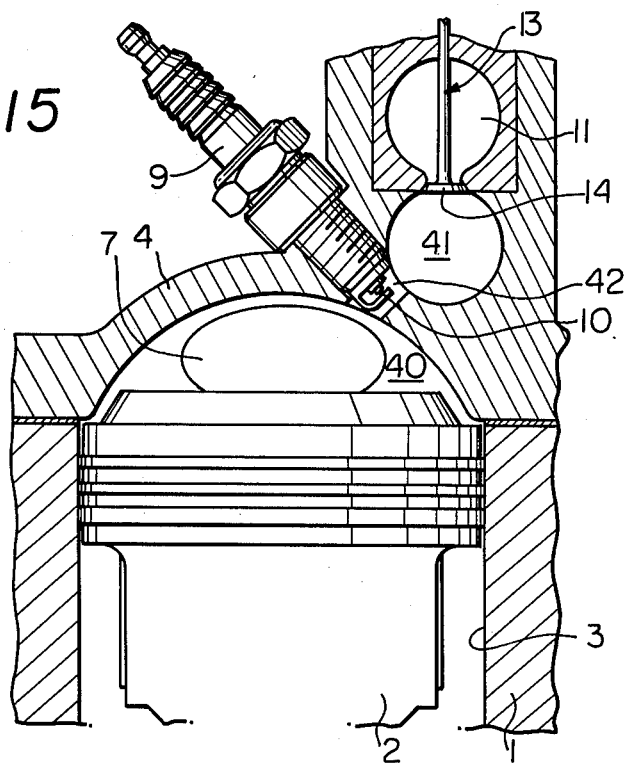
FIG. 15 is a cross-sectional side view of a still further embodiment according to the present invention.

FIG. 15 shows a further embodiment of an engine shown in FIG. 11. Referring to FIG. 15, the electrode 10 of the spark plug 9 is arranged in the connecting passage 42. In this embodiment, since the electrode 10 of the spark plug 9 is directly exposed to the stream of the combustible mixture spouted out into the main combustion chamber 40 from the accumulation chamber 11 and flowing into the accumulation chamber 11 from the main combustion chamber 40, the scavenging operation of the electrode 10 is considerably improved.

Figure 16:
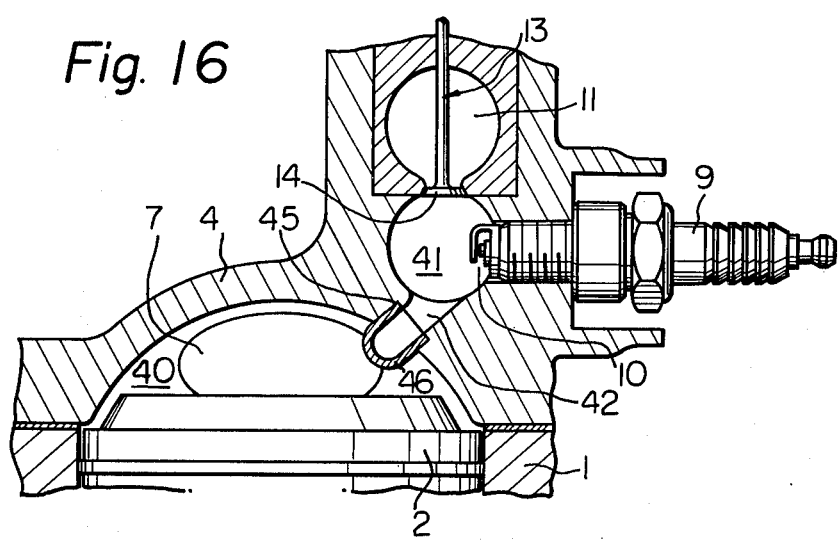
FIG. 16 is a cross-sectional side view of a still further embodiment according to the present invention.
Figure 17:
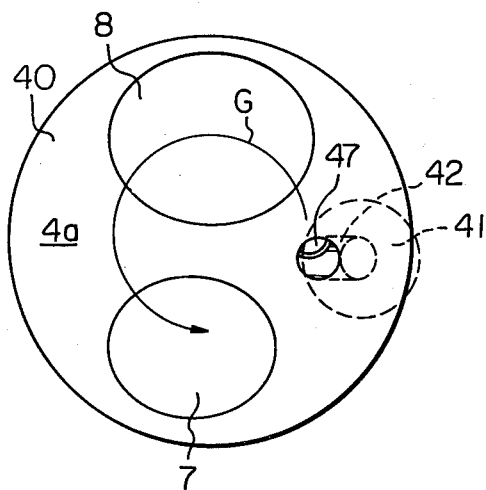
FIG. 17 is a bottom view of the cylinder head shown in FIG. 16.

FIGS. 16 and 17 show a still further embodiment of an engine shown in FIG. 11. Referring to FIGS. 16 and 17, the open end of a cap 46 is press-fitted into an annular groove 45 which is formed on the cylindrical inner wall of the connecting passage 42. This cap 46 has an opening 47 on its circumferential wall exposed to the main combustion chamber 40. In addition, the opening 47 is formed so as to be directed to the circumferential direction of the main combustion chamber 40, as shown in FIG. 17. Consequently, in this embodiment, the combustible mixture spouted out into the main combustion chamber 40 from the accumulation chamber 11 moves forward in the circumferential direction of the main combustion chamber 40 and, as a result, as is shown by the arrow G in FIG. 17, a swirl motion rotating above a vertical axis is created in the main combustion chamber 40.

Figure 18:
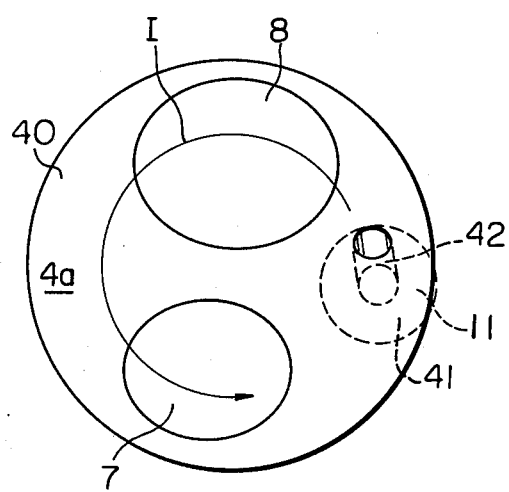
FIG. 18 is a bottom view of the cylinder head of a still further embodiment according to the present invention.

FIG. 18 shows a still further embodiment of an engine shown in FIG. 11. In this embodiment, the opening of the connecting passage 42 is directed to the circumferential direction of the combustion chamber 40, so that a swirl motion rotating about a vertical axis and shown by the arrow I in FIG. 18 is created in the main combustion chamber 40 by the combustible mixture spouted out into the main combustion chamber 40 from the accumulation chamber 11.

As mentioned above, according to the present invention, the pressure of the combustible mixture accumulated in the accumulation chamber is approximately equal to that in the combustion chamber which is generated when the ignition is carried out and, thus, the combustible mixture under a considerably high pressure is accumulated in the accumulation chamber. On the other hand, since the pressure in the combustion chamber immediately after the intake valve is closed is lower than the atmospheric pressure, at this time the pressure difference between the pressure in the combustion chamber and the pressure in the accumulation chamber is considerably large. Therefore, when the auxiliary valve is opened, a strong jet of the combustion mixture is spouted out into the combustion chamber from the accumulation chamber. In addition, since the jet of the combustible mixture continues to be spouted out into the combustion chamber during the first half of the compression stroke, a swirl motion continues to be maintained without being extinguished until the combustion is completed. As a result of this, the period of combustion is remarkably shortened. Consequently, even if a lean air-fuel mixture or a mixture containing large amount of the recirculated exhaust gas therein is used, a satisfactory high flame speed can be obtained. As a result of this, it is possible to improve thermal efficiency and output power while reducing the amount of harmful components in the exhaust gas. Needless to say, the present invention can be applied to a compression-ignition type internal combustion engine having a fuel injector arranged in the combustion chamber thereof. In this case, air is accumulated in the accumulation chamber.

While the invention has been described by reference to specific embodiments chosen for purposes of illustration, it should be apparent that numerous modifications could be made thereto by those skilled in the art without departing from the spirit and scope of the invention.

What is claimed is:

1. In a lean-mixture internal combustion engine having a cylinder block with a cylinder bore therein; a cylinder head mounted on said cylinder block, a piston reciprocally movable in said cylinder bore, a combustion chamber formed between said cylinder head and said piston, an intake valve movably mounted in said cylinder head for admitting a suction gas into said combustion chamber, an exhaust valve movably mounted in said cylinder head for discharging an exhaust gas from the combustion chamber into the atmosphere, and means for creating turbulent mixing during the combustion period in said combustion chamber, the improvement wherein said means for creating turbulence comprises:

a cavity in said cylinder head having a port connected to said combustion chamber;

valve means located in said port of the cavity;

means for actuating said valve means to shut said port near the end of each compression stroke of said piston to permit storage of the uncombusted suction gas accumulated in said cavity from said combustion chamber during the latter part of the compression stroke, at a pressure substantially equal to that in the combustion chamber just before said port is closed, and to reopen said port near the start of each compression stroke, to spout out a jet of said accmulated uncombusted gas under said pressure into said combustion chamber from said cavity during the first part of the compression stroke; and guide means formed in said cylinder head to provide a channel leading from said port of the cavity into the combustion chamber for guiding said jet of the accumulated suction gas to enter the combustion chamber in a direction having a substantial component tangent to a surface thereof to create a swirl motion in said combustion chamber strong enough to be sustained during the combustion period.

2. An internal combustion engine as claimed in claim 1, wherein said guide means comprises an open guide passage.

3. An internal combustion engine as claimed in claim 2, wherein said port of the cavity opens directly into the combustion chamber at a location offset from the axis of said cylinder bore, and said open guide passage is a groove formed in an upper surface of said combustion chamber.

4. An internal combustion engine as claimed in claim 3, wherein said valve means comprises a poppet valve having a valve head which is directly exposed to said combustion chamber, said groove being formed by a pair of vertical side walls and a semi-cylindrical end wall located at a position closely adjacent to the peripheral edge of said valve head.

5. An internal combustion engine as claimed in claim 3, wherein said groove extends from the port of said cavity to a location adjacent the circumferential wall of said combustion chamber in a direction approximately tangent to the circumferential wall at said location.

6. An internal combustion engine as claimed in claim 5, wherein said suction gas is an air-fuel mixture, and said engine further includes a spark plug located in said combustion chamber.

7. An internal combustion engine as claimed in claim 6, wherein said spark plug is located on the extension of said groove.

8. An internal combustion engine as claimed in claim 6, wherein the upper part of the combustion chamber formed in the cylinder head is concave, and said spark plug is located near the apex of said combustion chamber.

9. An internal combustion engine as claimed in claim 5, wherein said suction gas is air, and said engine further includes a fuel injector arranged in said combustion chamber.

10. An internal combustion engine as claimed in claim 1, wherein said guide passage comprises an enclosed connecting passage formed in said cylinder head.

11. An internal combustion engine as claimed in claim 10, wherein the opening into the combustion chamber of said connecting passage is directed toward a top surface of said piston for creating a swirl motion rotating about a horizontal axis in said combustion chamber.

12. An internal combustion engine as claimed in claim 10, wherein the axis of said connecting passage is substantially tangent to the circumferential direction of said combustion chamber at said opening for creating a swirl motion rotating about a vertical axis in said combustion chamber.

13. An internal combustion engine as claimed in claim 12, wherein said suction gas is an air-fuel mixture, and said engine further includes a spark plug located in said combustion chamber.

14. An internal combustion engine as claimed in claim 13, wherein said spark plug is located in the extended path of said connecting passage.

15. An internal combustion engine as claimed in claim 13, wherein the upper part of the combustion chamber formed in the cylinder head is concave, and said spark plug is located near the apex of said combustion chamber.

16. An internal combustion engine as claimed in claim 15, further comprising an auxiliary passage formed in said cylinder head and communicating said combustion chamber with said connecting passage, the opening of said auxiliary passage being directed toward said spark plug.

17. An internal combustion engine as claimed in claim 12, wherein said suction gas is air, and said engine further includes a fuel injector arranged in said combustion chamber.

18. An internal combustion engine as claimed in claim 2, wherein said guide passage comprises a cylindrical hollow member fixed onto an inner wall of said combustion chamber.

19. An internal combustion engine as claimed in claim 18, wherein said cylindrical hollow member comprises a cap having an opening directed in the circumferential direction of said combustion chamber.

20. An internal combustion engine as claimed in claim 1, wherein said combustion chamber comprises a main combustion chamber, and the engine further includes an auxiliary combustion chamber which is arranged between said main combustion chamber and said cavity, said auxiliary combustion chamber being connected to the cavity through said port and to said main combustion chamber via a connected passage.

21. An internal combustion engine as claimed in claim 20, wherein said connecting passage opens in the circumferential direction of said combustion chamber for creating a swirl motion rotating about a vertical axis in said main combustion chamber.

22. An internal combustion engine as claimed in claim 20, wherein the opening of said connecting passage is directed toward a top surface of said piston for creating a swirl motion rotating about a horizontal axis in said main combustion chamber.

23. An internal combustion engine as claimed in claim 20, wherein said suction gas is an air-fuel mixture, and said engine further includes a spark plug located in the combustion chamber.

24. An internal combustion engine as claimed in claim 23, wherein said spark plug is located in said connecting passage.

25. An internal combustion engine as claimed in claim 23, wherein said cavity is arranged above said auxiliary combustion chamber, said spark plug being located in said auxiliary combustion chamber.

26. An internal combustion engine as claimed in claim 25, wherein said cavity and said auxiliary combustion chamber are coaxially arranged on a common vertical axis.

27. An internal combustion engine as claimed in claim 25, wherein said connecting passage is tangentially connected to a circumferential inner wall of said auxiliary combustion chamber.

28. An internal combustion engine as claimed in claim 27, wherein said cavity is eccentrically arranged with respect to a vertical axis of said auxiliary combustion chamber, said valve means comprising a poppet valve having a valve head, a shroud being formed on a rear surface of said valve head.

29. An internal combustion engine as claimed in claim 1, wherein said engine further comprises ignition means having a spark plug, said port of the cavity remaining opened over a crank angle ranged from a crank angle near that at which said intake valve is closed to a crank angle near that at which the ignition is carried out.

30. An internal combustion engine as claimed in claim 1, wherein said suction gas is an air, said engine further comprising a fuel injector arranged in said combustion chamber.

31. An internal combustion engine as claimed in claim 1, wherein said valve means comprises a poppet valve driven by said engine.

\* \* \* \* \*

UNITED STATES PATENT AND TRADEMARK OFFICE
CERTIFICATE OF CORRECTION

PATENT NO. : 4,191,135
DATED : March 4, 1980
INVENTOR(S) : Hidetaka Nohira et al.

It is certified that error appears in the above—identified patent and that said Letters Patent is hereby corrected as shown below:

Column 1, line 51, "(I)" should read -- (II) --.

Column 6, line 37, "tming" should read -- timing --.

Column 8, line 54, after "combustible" insert -- mixture --.

Column 10, line 40, "accmulated" should read -- accumulated -.

Signed and Sealed this

Twenty-third Day of June 1981

[SEAL]

*Attest:*

RENE D. TEGTMEYER

*Attesting Officer*   *Acting Commissioner of Patents and Trademarks*